United States Patent [19]

Miller

[11] 3,832,594

[45] Aug. 27, 1974

[54] DYNAMIC CONVERGENCE CIRCUIT

[75] Inventor: Marvin E. Miller, Des Plaines, Ill.

[73] Assignee: Warwick Electronics Inc., Chicago, Ill.

[22] Filed: Oct. 26, 1972

[21] Appl. No.: 301,261

[52] U.S. Cl......... 315/13 C, 315/13 CG, 315/27 TD

[51] Int. Cl............................................. H01j 29/50

[58] Field of Search.......... 315/13 C, 13 CG, 27 TD

[56] References Cited

UNITED STATES PATENTS

| | | | |
|---|---|---|---|
| 3,375,398 | 3/1968 | Ohlhorst | 315/13 C |
| 3,447,025 | 5/1969 | Kool | 315/13 C |
| 3,491,261 | 1/1970 | Hill et al | 315/13 C |
| 3,500,113 | 3/1970 | Allen | 315/13 C |
| 3,519,875 | 7/1970 | Brockmann | 315/13 C |
| 3,586,902 | 6/1971 | Siegal | 315/13 C X |
| 3,613,109 | 10/1971 | Jarosz | 315/13 C |
| 3,708,715 | 1/1973 | Rhee | 315/13 C |
| 3,745,405 | 7/1973 | Fuse | 315/13 C |
| 3,763,391 | 10/1973 | Rollins | 315/13 C |

*Primary Examiner*—Leland A. Sebastian
*Assistant Examiner*—P. A. Nelson
*Attorney, Agent, or Firm*—Wegner, Stellman, McCord, Wiles & Wood

[57] ABSTRACT

A convergence coil has both ends coupled through separate resistors to the same DC voltage. A pair of potentiometers have their fixed resistance portions coupled in parallel across the convergence coil. The wipers of both potentiometers are individually coupled to separate transistor amplifiers controlled by opposite going vertical deflection waveforms, so that the transistor amplifiers independently control convergence correction during the beginning and the end of a vertical scanning interval, respectively.

13 Claims, 6 Drawing Figures

DYNAMIC CONVERGENCE CIRCUIT

BACKGROUND OF THE INVENTION

This invention relates to a dynamic convergence circuit with a pair of independent convergence adjustments for an electron beam and which are effective during different portions of a scanning interval.

Prior vertical convergence circuits have included a pair of adjustable elements for controlling the magnitude of convergence correction applied to an electron beam while scanning the top and bottom of a CRT screen. Typically, considerable interaction occurs between the top and bottom convergence adjustments, so that convergence correction becomes a time consuming operation. Many dynamic convergence circuits also require special waveforms, necessitating special shaping circuitry. For example, many convergence circuits require a parabolic input signal.

Typical dynamic convergence circuits do not allow completely independent control of the direction of current flow through a convergence coil, for both the top and bottom portions of a vertical scan. Depending on the CRT and the deflection signals generated by a television receiver, convergence correction may require different magnitude and polarity convergence currents for the top and bottom portions of the screen, and the type of correction may vary with different television receivers of the same design. Also, as electronic components age, the bias levels of amplifiers in prior active convergence circuits may change, undesirable deflecting an electron beam in the vicinity of the center screen position, and hence requiring a compensating adjustment to the static convergence apparatus.

SUMMARY OF THE INVENTION

In accordance with the present invention, the above noted disadvantages of prior dynamic convergence circuits have been overcome. A pair of the completely independent convergence adjustments for the same electron beam allow convergence at opposite ends of the screen, without interaction therebetween. The circuit operates from a sawtooth waveform already present in television receivers, and requires little shaping circuitry.

In particular, a convergence coil has both ends coupled to the same DC voltage. A pair of voltage divider circuits are connected in parallel across the convergence coil, and are controlled by transistor amplifiers driven by oppositely going scanning waveforms. Since the convergence coil is coupled across the same DC voltage, aging of components or a change in the magnitude of the DC voltage, does not produce any current flow through the convergence coil. This results in a stable circuit which does not undesirably change the amount of deflection of the electron beam in the vicinity of the center of the screen as the electronic components age. The voltage divider circuits allow completely independent control over the direction and magnitude of current flow through the convergence coil during beginning and end portions of the scanning interval.

One object of this invention is the provision of an improved dynamic convergence circuit having a pair of completely independent convergence adjustments each effective over a different portion of a scanning interval.

Another object of this invention is the provision of an improved dynamic convergence circuit in which a convergence coil has both ends coupled to the same DC voltage.

Still another object of this invention is the provision of an improved dynamic convergence circuit in which a convergence coil has a pair of potentiometers coupled in parallel thereacross. The wipers of the potentiometers are each coupled to transistor amplifiers driven by oppositely going scanning waveforms.

Other objects and features of the invention will be apparent from the following description and from the drawings. While an illustrative embodiment of the invention is shown in the drawings and will be described in detail herein, the invention is susceptible of embodiment in many different forms and it should be understood that the present disclosure is to be considered as an exemplification of the principles of the invention and is not intended to limit the invention to the embodiment illustrated.

DESCRIPTION OF THE PREFERRED EMBODIMENT

Figure 1:
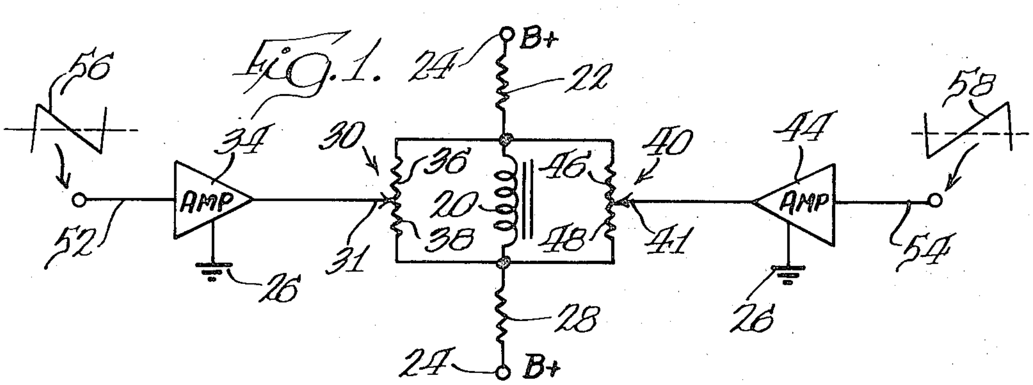
FIG. 1 is a schematic diagram illustrating the principles of the applicant's dynamic convergence circuit.

Referring to FIG. 1, a convergence coil 20 has one end coupled through an impedance, as a resistor 22, to a bias source 24 of DC voltage or B+, which is at a fixed magnitude with respect to the potential of a reference source or ground 26. The opposite end of the convergence coil 20 is coupled through an impedance, as a resistor 28, which desirably has the same resistance value as resistor 22, to the same B+ source 24. It will be appreciated that the above described connection prevents any current flow through the convergence coil 20 since the same DC voltage is coupled across both ends thereof. Furthermore, this condition will not change even though resistors 22 and 28 change in value, or the DC voltage shifts in value with respect to ground 26.

A first potentiometer 30 has a wiper 31 coupled to an amplifier 34, and a fixed resistance portion coupled across the convergence coil 20. The fixed resistance impedance consists of a first variable portion 36, located between the movable wiper 31 and the upper end of potentiometer 30, and a second variable portion 38, located between movable wiper 31 and the lower end of the potentiometer 30. The resistance values of the portions 36 and 38 change in inverse proportion to the position of the wiper 31.

A second potentiometer 40 is connected in parallel with potentiometer 30 and convergence coil 20, and has a wiper 41 coupled to an amplifier 44. The fixed resistance portion of potentiometer 40, coupled across convergence coil 20 and potentiometer 30, consists of a first variable portion 46, located between the movable wiper 41 and the upper end of potentiometer 40, and a second variable portion 48, located between movable wiper 41 and the lower end of potentiometer

40. The values of the resistive impedance portions 46 and 48 vary inversely with the position of wiper 41.

Amplifiers 34 and 44 form dynamic current control means having separate control inputs 52 and 54, respectively, which are coupled to oppositely going scanning waveforms 56 and 58, respectively. When energized, the internal resistance of each amplifier to ground is low compared to the total fixed resistance of portions 36 and 38, and portions 46 and 48. Each amplifier, in response to a positive going signal, shunts or sinks current at the output thereof to ground 26. Due to inverted scan waveforms 56 and 58, amplifier 34 operates during the first half of the scan interval, and amplifier 44 operates during the last half of the scan interval. The magnitude of the control input to each amplifier controls the magnitude of current flowing to the associated wipers. The direction or polarity of current flow through the coil 20 is selected by moving the wipers off center towards either end of the fixed resistance portions. The amount by which the wipers are off center controls the magnitude of current flow from the amplifier which is allows to pass through the convergence coil 20.

When amplifier 34 is energized, for example, the convergence coil 20 is effectively placed between the center junctions of two voltage dividers each connected between B+ and ground 26. One of the voltage dividers comprises resistor 22 in series with resistance portion 36. The other voltage divider comprises resistance 28 in series with the resistance portion 38. During the time amplifier 34 is biased on, there is essentially no current flow to ground 26 through the reverse biased amplifier 44.

During the last half of the scanning interval, when only amplifier 44 is biased on, the position of wiper 41 determines the magnitude and direction of current flow through the convergence coil 20. While amplifier 44 is biased on, convergence coil 20 is effectively placed between the center junctions of a different pair of voltage dividers; namely, a first voltage divider formed by the resistance portion 46 in series with resistor 22 and a second voltage divider formed by resistance portion 48 in series with resistor 28.

Figures 2, 3A, 3B, 3C, 3D:
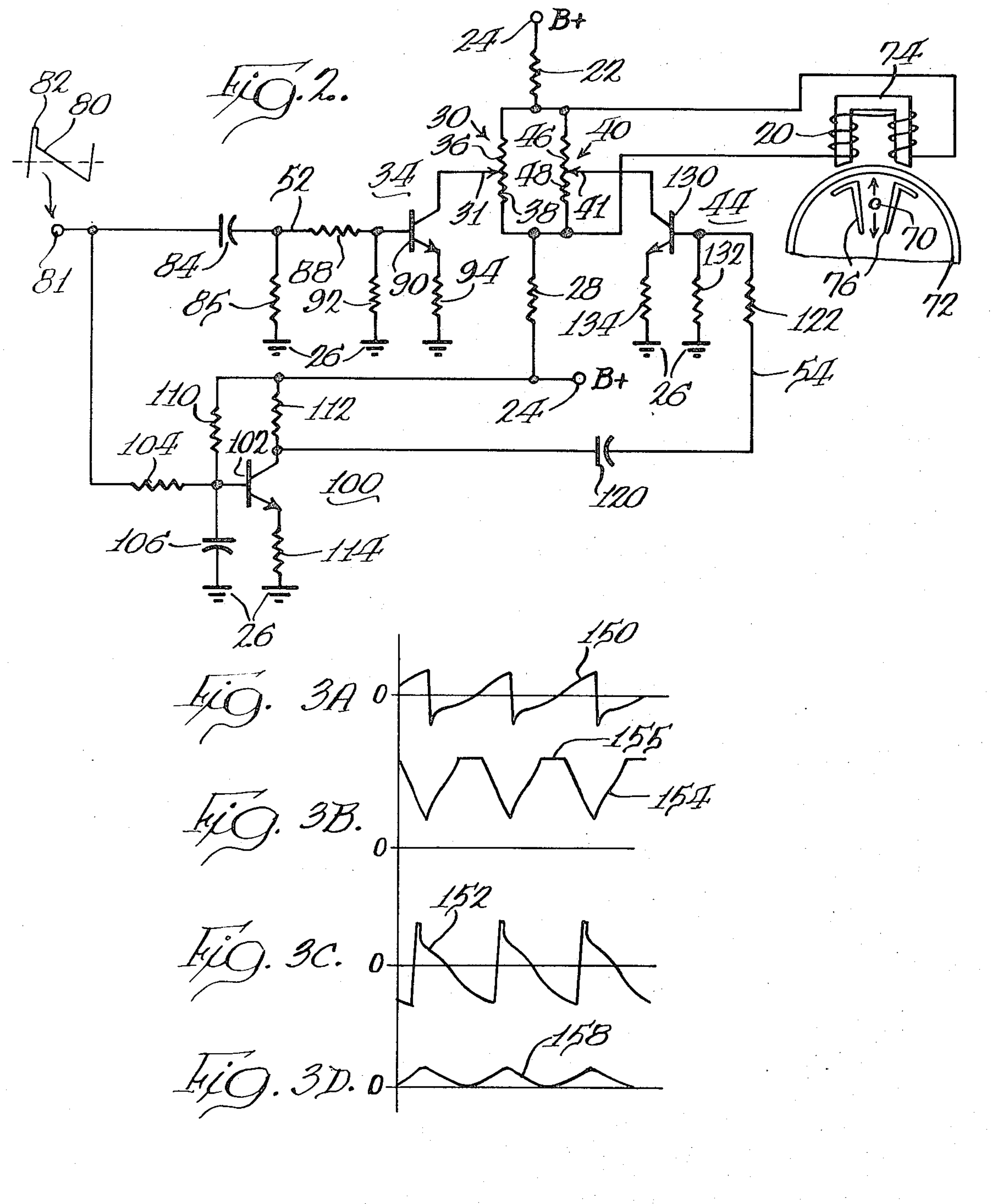
FIG. 2 is a schematic diagram of a vertical convergence circuit for a color television receiver, which incorporates the dynamic convergence circuit illustrated in FIG. 1.
FIGS. 3A, 3B, 3C and 3D illustrate waveforms found at various points in the circuit of FIG. 2.

In FIG. 2, a complete circuit is illustrated for applying dynamic vertical convergence to an electron beam 70 of a conventional color image reproducing system having a tri-beam color cathode ray tube (CRT) 72. The electron beam 70 is located at the top of the triangle representing the delta gun configuration of the CRT 72. In virtually all television receivers using delta gun configuration CRTs, the illustrated electron beam 70 would correspond to the blue color beam. The convergence coil 20 is wound about a convergence yoke 74 spaced from internal magnitude pole pieces 76. The vertical convergence circuit moves the blue electron beam 70 vertically so as to properly converge the blue horizontal lines observed on the face or screen of the CRT 72.

A negative going sawtooth waveform 80, which may be taken from the vertical output stage of the TV receiver, is applied to input terminal 81. Since waveform 80 is taken directly from the vertical output stage which develops the vertical deflection signal, it includes a vertical retrace pulse 82 occuring at the end of each vertical scanning interval. The vertical retrace pulse is not detrimental to the operation of the illustrated circuit, since it is reshaped and reduced in amplitude by the RC components within the circuit.

A differentiator, formed by a capacitor 84 and a resistor 85, couples the negative going sawtooth waveform 80 to a resistor 88 coupled to the base or control electrode of an NPN transistor 90 or other controllable conduction device suitable for use as the amplifier 34. A resistor 92 is coupled between the base electrode and ground 26, and forms with resistor 88 a voltage divider for the base biasing signal. The emitter electrode of transistor 90 is coupled through an emitter resistor 94 to ground 26, and the collector electrode is coupled directly to the wiper 31. The value of emitter resistor 94 is chosen so as to be small compared to the values of the other resistances in the circuit.

To invert the sawtooth waveform 80 for amplifier 44, an inverter 100 is coupled with input terminal 81. The inverter includes an NPN transistor 102 having a base or control electrode coupled to an integrator, formed by resistor 104 and capacitor 106, which in turn is coupled to the input terminal 81. A pair of resistors 110 and 112 couple the base and collector electrodes, respectively, of transistor 102 to the B+ supply 24. An emitter resistor 114 couples the emitter electrode of transistor 102 to ground 26. The values of resistors 110, 112 and 114 are selected such that transistor 102 has a quiescent point which is just slightly on, that is, slightly forward biased into its conducting region.

The output of inverter 100 is coupled through a capacitor 120 and a resistor 122 to the base or control electrode of an NPN transistor 130. A resistor 132 couples the base electrode to ground 26 and forms a voltage divider with resistor 122. An emitter resistor 134 couples the emitter electrode of transistor 130 to ground 26. The collector electrode of transistor 130 is directly connected to wiper 41. The resistance values of the resistors associated with amplifier 44 may be selected to be equal to the values of corresponding resistors in amplifier 34.

FIG. 3 illustrates various voltage and current waveforms occurring in the circuit of FIG. 2. The voltage at the base of transistor 130 is illustrated by curve 150 of FIG. 3A. The dip at the center of the scan is caused by the integrator formed by resistor 104 and capacitor 106, which causes the zero crossing point to occur after the exact center of a scan interval. The voltage at the base of transistor 90 is illustrated by curve 152 of FIG. 3C. The differentiator formed by capacitor 84 and resistor 85 causes the zero crossing point of curve 152 to occur prior to the exact center of a vertical scan interval. As a result of these wave shaping circuits, the transistors 90 and 130 are both off during the center of the scan, during which a conventional static convergence apparatus (not illustrated) is effective.

The collector voltages for both transistors 90 and 130 takes the form shown as curve 154 in FIG. 3B. A flat portion 155 of the collector voltage curve 154 corresponds to the center of the scanning interval, when both transistors 90 and 130 are off. The resulting total current through the convergence coil 10 is illustrated as curve 158 in FIG. 3D. The total current has a minimum approximately equal to zero, at the center of the scan which corresponds to the flat portions 155 of the collector voltage. The direction of current flow is illustrated for a particular setting of the potentiometer wipers, but it will be appreciated that an opposite setting equally offset from the center point would cause a current flow in the negative direction.

Various changes can be made to the illustrated circuit without departing from the present invention. If the values of resistors 22 and 28 are unequal, then the positions of the wipers must be offset from center in order to produce equal voltages across the convergence coil 20. The resistors 22 and 28 can be coupled to different DC voltage levels, thereby producing a steady DC current through convergence coil 20 for purposes of static convergence. Other changes will be apparent to those skilled in the art.

I claim:

1. In a color image reproducing system having a cathode ray tube with at least one electron beam requiring convergence correction during a scanning interval, a convergence circuit comprising:

a convergence coil associated with said electron beam and having a first end and a second end;

voltage reference level means;

DC source means for establishing a single DC voltage level differing from that established by said voltage reference level means;

coupling means for DC coupling said first and second ends of said convergence coil to said single DC voltage level to prevent a current flow through said convergence coil due solely to the DC source means;

current controlling means for controlling the direction and magnitude of current flow through said convergence coil, including a first variable impedance portion located between said first end of said convergence coil and a junction, a second variable impedance portion located between said second end of said convergence coil and said junction, and adjustment means for inversely adjusting the impedances of said first and second variable impedance portions.

2. In a color image reproducing system having a cathode ray tube with at least one electron beam requiring convergence correction during a scanning interval, a convergence circuit comprising:

a convergence coil associated with said electron beam and having a first end and a second end;

a potentiometer having a wiper movable across a fixed resistance, said fixed resistance being connected in parallel across said convergence coil;

voltage reference level means;

DC source means for establishing a single DC voltage level differing from said voltage reference level means;

coupling means for DC coupling said first and second ends of said convergence coil to said single DC voltage level to prevent a current flow through said convergence coil due solely to the DC source means; and current controlling means including said potentiometer for controlling the direction and magnitude of current flow through said convergence coil, including a source of deflection signals, said source being coupled to said wiper.

3. The convergence circuit of claim 2 wherein said current controlling means includes dynamic current control means in series with said wiper for controlling the current flow through the fixed resistance during at least a portion of said scanning interval.

4. The convergence circuit of claim 3 wherein dynamic current control means comprises a controllable conduction device having a control electrode and a pair of output electrodes, said output electrodes being coupled in series between said wiper and said voltage reference level and means coupling said control electrode to said source of deflection signal which occurs during said scanning interval.

5. The convergence circuit of claim 2 wherein said coupling means comprises first resistance means for connecting said first end of said convergence coil to said DC source means and second resistance means for connecting said second end of said convergence coil to said DC source means.

6. The convergence circuit of claim 1 including second current controlling means for controlling the direction and magnitude of current flow through said convergence coil independent of said first named current controlling means and operative during a different portion of said scanning interval.

7. The convergence circuit of claim 6 wherein said second current controlling means includes a third variable impedance portion located between said first end of said convergence coil and a second junction a fourth variable impedance portion located between said second end of said convergence coil and said second junction, and second adjustment means for inversely adjusting the impedances of said third and fourth variable impedance portions.

8. The convergence circuit of claim 7 wherein each of said current controlling means comprises a separate potentiometer having a wiper movable across a fixed resistance connected in parallel with said convergence coil, a portion of said fixed resistance between one end thereof and said wiper corresponding to said first and third variable impedance portions and a portion of said fixed resistance between the other end thereof and said wiper corresponding to said second and fourth variable impedance portions, each of said wipers corresponding to said adjustment means.

9. In a color image reproducing system having a cathode ray tube with at least one electron beam requiring convergence correction, and deflection circuit means for generating a deflection signal during a scanning interval, a convergence circuit comprising:

a convergence coil associated with said electron beam and having a first end and a second end;

voltage reference level means;

DC source means for establishing at least one DC potential difference with respect to said voltage reference level means;

a pair of impedance means for respectively connecting said first and second ends of said convergence coil to said DC source means;

first and second voltage divider means connected in parallel with said convergence coil, each voltage divider means having an adjustable element; and first and second current controlling means respectively connected to the adjustable elements of said first and second voltage divider means and operative during different portions of said scanning interval to control the flow of current between said adjustable elements and said voltage reference level means.

10. The convergence circuit of claim 9 wherein said DC source means establishes at output terminal means a single DC voltage level with respect to said voltage reference level, said pair of impedance means comprises a pair of resistors for respectively connecting said first and second ends of said convergence coil to said output terminal means.

11. The convergence circuit of claim 9 wherein each of said voltage divider means includes potentiometer means having an adjustable wiper movable across a fixed resistance, said fixed resistance being coupled in parallel across said convergence coil and said adjustable wiper being coupled to said current controlling means.

12. The convergence circuit of claim 11 wherein each current controlling means further includes device means having first, second and third electrodes, said first and second electrodes being DC coupled between said adjustable wiper and said voltage reference level, and means for coupling said third electrode to said deflection circuit means to drive said device means into its conductive state for one or the other of said different portions of said scanning interval.

13. The convergence circuit of claim 12 wherein the coupling means in each of said current controlling means comprises wave shaping means for wave shaping the deflection signal to drive the associated device means into conduction for less than one half cycle of said scanning interval so that both of the device means in said first and second current controlling means are inoperative during a center portion of said scanning interval.

* * * * *